S. H. PENICK.
REMOVABLE HANDLE.
APPLICATION FILED JAN. 22, 1913.
1,115,334.
Patented Oct. 27, 1914.
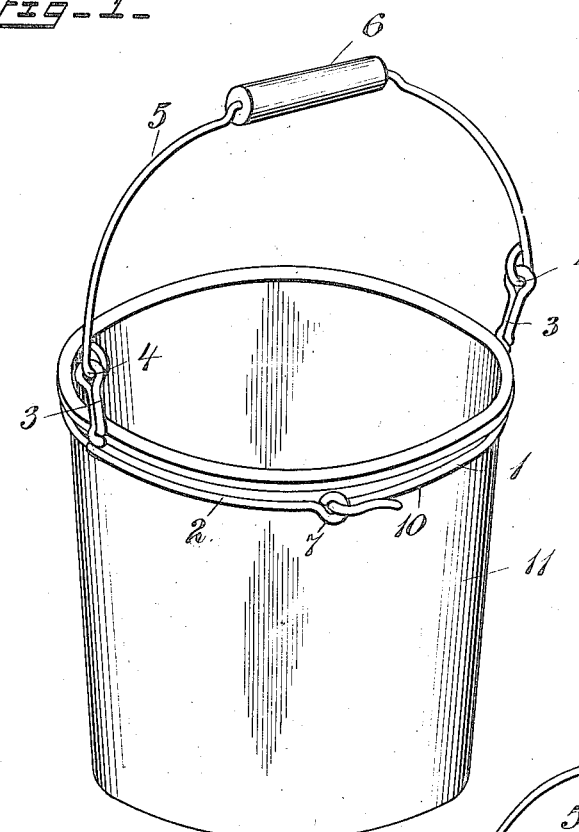
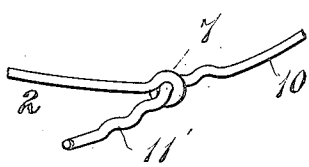
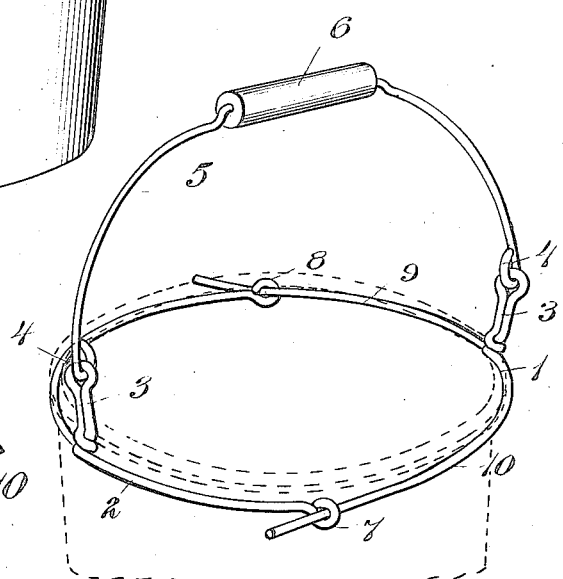
Inventor
Stephen H. Penick.
Witnesses
By Victor J. Evans.
Attorney

UNITED STATES PATENT OFFICE.

STEPHEN H. PENICK, OF MARTIN, TENNESSEE.

REMOVABLE HANDLE.

1,115,334. Specification of Letters Patent. Patented Oct. 27, 1914.

Application filed January 22, 1913. Serial No. 743,637.

*To all whom it may concern:*

Be it known that I, STEPHEN H. PENICK, a citizen of the United States, residing at Martin, in the county of Weakley and State of Tennessee, have invented new and useful Improvements in Removable Handles, of which the following is a specification.

The present invention relates to removable handles for crocks, jars, churns and the like, and resides in the construction, combination and operative arrangement of parts set forth in the following description and falling within the scope of the appended claim.

In the drawing: Figure 1 is a view illustrating my device in applied position upon a suitable utensil. Fig. 2 is a similar view of a device, the utensil being illustrated in dotted lines, and illustrating means whereby one of the loop members of the removable handle is arranged in securing position with relation to the second loop member of the handle, and Fig. 3 is an enlarged detail perspective view illustrating one of the arms of one of the loops coacting with the eye of the second loop of the device. Fig. 4 is an enlarged detail perspective view illustrating a slight modification of the manner of connecting the loops together.

The improvement comprises essentially a pair of substantially U-shaped loops indicated by the numerals 1 and 2 respectively. The loops are preferably constructed of resilient and bendable wire, and each of the loops is centrally twisted to provide upstanding ears 3 to which are attached the hook ends 4 of a bail 5 which provides the handle proper. The bail 5 has its central portion offset to provide a straight portion for the reception of a sleeve 6.

The loop 2 has its ends provided with eyes 7 and 8 which are arranged outwardly and at an angle with relation to the said arms. The arms 9 and 10 of the loop 1 are adapted to pass through the eyes 7 and 8 of the loop 2. These arms 9 and 10, being constructed of spring material, are adapted to exert an outward tension so as to tightly engage with the outer portions of the eyes 7 and 8, and if desired and as illustrated in Fig. 1 of the drawing, the portions of the arms 9 and 10 which extend beyond the eyes 7 and 8 may be bent around the said eyes and thus securely retain the loops upon a vessel 11.

In certain instances I have found it desirable to provide the arms 9 and 10 with spaced notches 11', and by such a construction, it will be noted that the said arms at all times exerting an outward tension, will, when properly adjusted within the eyes 8 and 9, have certain of their notches engaged by the said eyes to prevent the accidental withdrawal of the arms through the eyes. With such an arrangement the necessity of bending of the ends of the arms is entirely dispensed with, and the said loops are automatically locked when pressed one toward the other. The spaced notches 11' are formed by the crimping of the terminal portions of the arms 9 and 10 of the loop 1.

From the above description, taken in connection with the drawings, the simplicity of the device as well as the advantages thereof, will, it is thought, be perfectly apparent to those skilled in the art to which such inventions appertain without further detailed description.

Having thus described the invention, what I claim is:

In a device for the purpose set forth, a pair of oppositely arranged U-shaped loops of substantially equal length and constructed of resilient but bendable material and adapted to embrace a receptacle, each of the loops being centrally provided with upstanding ears, a bail connected with the ears, the terminals of the arms of one of the loops being formed with eyes arranged at an angle to the arms, the terminal portions of the arms of the second loop adapted to pass through the eyes and to exert a tension against the inner circumference of said eyes, and the same arms of the second loop being provided at and adjacent to their terminals with spaced notches for adjustably engaging with the inner circumference of the eyes, the said spaced notches being formed by the crimping of the terminal portions of the second loop.

In testimony whereof I affix my signature in presence of two witnesses.

STEPHEN H. PENICK.

Witnesses:
JEPTHAB C. EGELL,
ALPHEUS B. ADAMS.